April 6, 1965 — G. H. MOREY — 3,177,344
SHIELDED ELECTRIC HEATING MANTLE
Filed Nov. 8, 1962
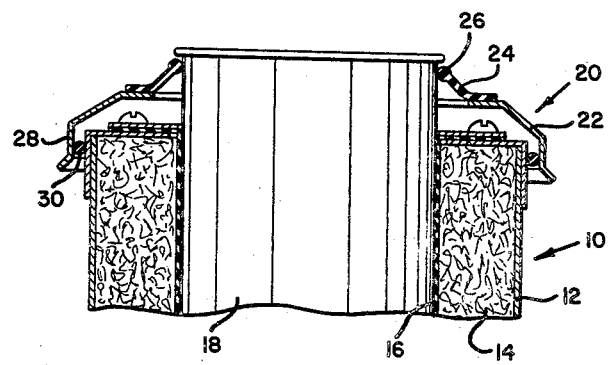
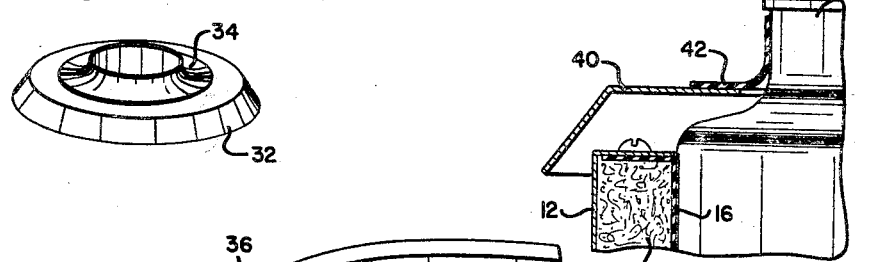
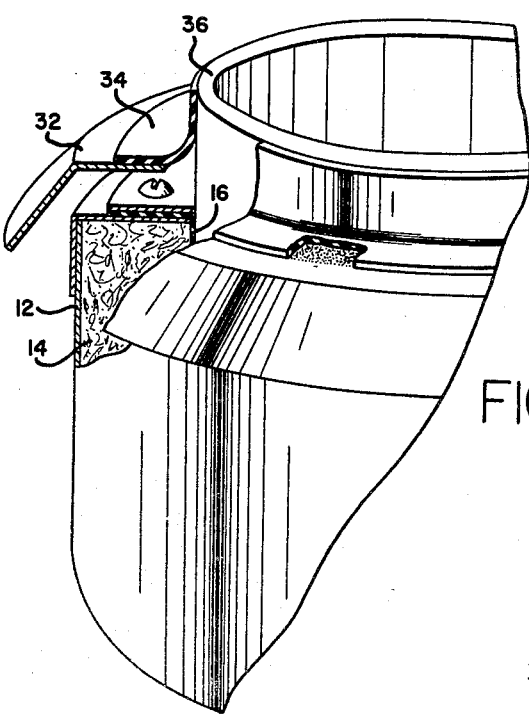
INVENTOR.
GLEN H. MOREY
BY Toulmin & Toulmin
ATTORNEYS

United States Patent Office 3,177,344
Patented Apr. 6, 1965

3,177,344
SHIELDED ELECTRIC HEATING MANTLE
Glen H. Morey, Terre Haute, Ind., assignor to Templeton Coal Company, Terre Haute, Ind., a corporation of Indiana
Filed Nov. 8, 1962, Ser. No. 236,300
1 Claim. (Cl. 219—433)

This invention relates to a protective or shielding device for a heated container and is a continuation in part of my now pending application, Serial No. 167,108 filed January 18, 1962, and assigned to the same assignee as the instant application.

In my prior application, I show a shielding device for containers which are being heated by an electric heating mantle. An electric mantle consists, basically, of a heat resistant fabric to which is secured an electric heat element where the fabric is flexible, and this permits it to conform substantially exactly to the configuration of the container being heated, and this also brings the heating element into an efficient heat transfer relation with the container. A suitable supporting frame supports the fabric, and the container to be heated is placed in the frame and is supported directly on the fabric.

With heating elements of this nature, as well as with other types, the possibility exists that liquids in the container will boil over or will foam up and spill out over the top of the container, or will in some other way be spilled so that they fall on the outside of the container being heated.

This can create a hazard where the liquids are corrosive, inflammable or explosive, and in addition, the heating mantle or whatever heating device is being employed, can be damaged or completely ruined by the liquids.

In my prior application, I show a relatively simple shielding device consisting of a resilient element adapted for embracing the periphery of the container near the top, and with the element itself, or an additional member connected thereto, extending outwardly so as to form a shield or umbrella-like device that will deflect spilled liquids from direct contact with the heating device. In my prior application, I show the shielding device also in sealing engagement with the frame of the heating mantle, thereby substantially completely isolating the heating mantle from the liquid, and also any heating fabrics that might be generated thereby.

In the practice of this invention, I have found that a relatively simple and distinctive sealing arrangement can be constructed which does not sealingly engage the heating mantle, and which shield may be supported entirely on the container being heated. A device of this nature permits movement of the container without the necessity of disengaging the shield from the frame of the heating mantle, for this is of advantage because the shield and the heating mantle might become quite hot in the process of heating the container, and, furthermore, if there are any spilled liquids on the shield of a corrosive nature, it might be hazardous to attempt to disengage the shield from the heating mantle.

With the foregoing in mind, the present invention constitutes, briefly, of a substantially rigid outer ring, annular in configuration, and secured about the inner periphery of the annular ring, a somewhat smaller resilient ring which later forms the means directly engaging the container being heated and providing the support for the rigid outer ring, preferably, the rigid outer ring to be of spun aluminum or the like which is light and inexpensive, while the inner resilient ring is of a rubber-like material, such as silicone rubber, which may be, at least in part, textile reinforced.

The shield, according to the present invention, is placed upon the container and forms a device which will direct spilled or over-flowing liquid from the container outwardly from the heating device so that no contact with the heating device will be had.

The exact nature of the present invention will be more fully understood upon reference to the following specifications taken in connection with the accompanying drawings in which:

FIGURE 1 is a vertical section somewhat diagrammatic in nature showing work from which a shield, according to the present invention, can take.

FIGURE 2 is a perspective view partly in section showing another form which the shield can take.

FIGURE 3 is the perspective view showing the shield itself disconnected from a container, and FIGURE 4 is a fragmentary view similar to FIGURE 2 showing the shield arranged for cooperation with a container of a type different from that illustrated in FIGURE 2.

Referring to the drawings somewhat more in detail, FIGURE 1 shows a heating mantle 10 which consists of an outer frame 12, insulation 14 therein, and heat resistant fabric 16 carried by the frame and forming a well for receiving a container 18, such as a beaker. Fabric 16 has stitched thereto an electric resistance heating element which may be energized in any suitable manner, and which is preferably thermostatically controlled. Fabric 16 may be high temperature glass, quartz, asbestos or any desired combination thereof.

According to the present invention, the heating mantle is shielded from liquid spilled from container 18 by a shielding device generally indicated at 20, and which comprises an outer annular rigid ring part or washer-like part 20, spun aluminum, for example, and an inner resilient annular ring part 24, silicone rubber, for example. The ring part 24 is capable of withstanding temperatures up to around 500° F. and any rubber, synthetic rubber or elastomeric plastic that will withstand this temperature without rapid deterioration is suitable for the practice of my invention.

Ring 24 is secured to ring 22 by a high temperature cement, and may, if desired, be formed with a beaded portion 26 about the opening therein for resiliently embracing the periphery of the container that is placed in the well of the heating mantle.

Ring 22 extends outwardly and downwardly so that liquids falling on the shield will run off from the shield about the outer edge thereof and thus will not come into contact with the heating mantle. If desired, the shield may have a dependent peripheral portion 28 so that a sealing ring 30, also preferably silicone rubber, can be placed between the shield and the heating mantle, and thereby exclude vapors from the interior of the heating mantle.

In other cases, as illustrated in FIGURE 3, there can be provided an outer rigid ring or washer-like element 32 having an upper horizontal part and outwardly inclined skirt portion, and to which ring is cemented, the rubber-like inner ring 34 which embraces the periphery of container 36.

In the arrangement of FIGURE 2, the shield is entirely supported by the container, and can be moved therewith, and adequately shields the heating mantle from the liquids that might be spilled on the shield.

The arrangement of FIGURE 2 shows a wide-mouthed container, while in FIGURE 4 there is shown a container 38 having a narrow neck portion, and in this case, the shield consists of the outer rigid ring or washer-like element 40 which has an upper part of substantial width with a relatively small rubber-like ring 42 cemented thereto at the inside. In the case of either of the FIGURE 2 or 4 modifications, the shield is entirely supported on the container and is movable therewith, and the outer ring part in either case may actually be spaced from the heating mantle. This has the advantage of maintaining the outer ring part somewhat cooler because the only heat that can be conducted directly thereto must pass through the resilient inner ring which is, of course, a relatively poor conductor.

FIGURE 3 shows the shield of FIGURE 2 without the container and it will be observed that the inner ring 34 has a high degree of resiliency so that it will, in itself, accommodate the shield to a plurality of different container sizes and configurations.

The shield element, according to my invention, is relatively inexpensive, is light, and is easy to put on a container and to remove therefrom, and does not interfere with movement of the container while the container is hot, because the shield device does not have to sealingly engage the frame of the heating mantle.

It will be understood that this invention is susceptible to modification in order to adapt it to different usages and conditions; and accordingly, it is desired to comprehend such modifications within this invention as may fall within the scope of the appended claim.

I claim:

In combination; an electric heating mantle having a rigid frame and an upwardly opening well, a heating element in said well, a container extending downwardly into the well for being heated by said heating element, a portion of said container extending about the top wall of said mantle, and a shield for preventing spilled liquids from running down the outside of the container into the well, said shield comprising a substantially rigid imperforate washer-like element carried by and disposed about the said portion of said container and spaced above the top wall of said mantle, elastic member at the inner edge of the said element in sealing engagement with said portion of the container, and the outer edge of the said element extending outwardly beyond the outer periphery of said mantle in spaced relation thereto and being inclined downwardly, said elastic member comprising the sole means for supporting the shield in operative position on the container.

References Cited by the Examiner

UNITED STATES PATENTS

| 1,622,587 | 3/27 | Housel | 126—383 |
| 1,961,136 | 6/34 | Cretors | 219—426 |
| 2,607,876 | 8/52 | Bergen et al. | 219—535 X |
| 2,955,191 | 10/60 | Galgano et al. | 219—433 |

FOREIGN PATENTS

| 324,324 | 1/30 | Great Britain. |
| 713,742 | 8/54 | Great Britain. |
| 994,293 | 8/51 | France. |
| 1,166,688 | 6/58 | France. |
| 938,820 | 2/56 | Germany. |
| 591,109 | 4/59 | Italy. |

RICHARD M. WOOD, *Primary Examiner.*

ANTHONY BARTIS, *Examiner.*